United States Patent
Onnela et al.

(10) Patent No.: US 8,305,742 B2
(45) Date of Patent: Nov. 6, 2012

(54) CYCLING COMPUTER ATTACHING MECHANISM AND METHOD

(75) Inventors: Hannu Onnela, Oulunsalo (FI); Visa Rauta, Oulu (FI); Timo Hirvonen, Oulu (FI)

(73) Assignee: Polar Electro Oy, Kempele (FI)

( * ) Notice: Subject to any disclaimer, the term of this patent is extended or adjusted under 35 U.S.C. 154(b) by 240 days.

(21) Appl. No.: 12/836,836

(22) Filed: Jul. 15, 2010

(65) Prior Publication Data

US 2011/0051340 A1 Mar. 3, 2011

(30) Foreign Application Priority Data

Aug. 28, 2009 (FI) ...................................... 20095888

(51) Int. Cl.
*G06F 1/16* (2006.01)
(52) U.S. Cl. .................... 361/679.02; 29/622; 73/379.01
(58) Field of Classification Search ............. 361/679.02; 29/622
See application file for complete search history.

(56) References Cited

U.S. PATENT DOCUMENTS

| | | | | |
|---|---|---|---|---|
| 4,780,864 A * | 10/1988 | Houlihan | ......................... | 368/10 |
| 4,819,217 A * | 4/1989 | Houlihan | ......................... | 368/10 |
| 5,177,432 A * | 1/1993 | Waterhouse et al. | .......... | 324/166 |
| 5,644,511 A * | 7/1997 | McWhorter | ................... | 702/148 |
| 6,069,788 A * | 5/2000 | Masui | ........................ | 361/679.55 |
| 6,192,300 B1 * | 2/2001 | Watarai et al. | ..................... | 701/1 |
| 6,204,752 B1 * | 3/2001 | Kishimoto | .................... | 340/432 |
| 6,328,268 B1 * | 12/2001 | Irie | ............................... | 248/230.1 |
| 6,406,049 B1 * | 6/2002 | Jimison et al. | .............. | 280/288.4 |
| 6,446,922 B2 * | 9/2002 | Irie | ............................... | 248/230.1 |
| 6,557,437 B2 * | 5/2003 | Masui et al. | .................. | 74/551.8 |
| 6,590,763 B2 * | 7/2003 | Kishimoto | ................ | 361/679.26 |
| 6,781,510 B2 * | 8/2004 | Takeda | ............................ | 340/432 |
| 6,930,878 B2 * | 8/2005 | Brackett et al. | ........... | 361/679.03 |
| 7,089,100 B2 * | 8/2006 | Takeda et al. | ................... | 701/32.5 |
| 7,132,931 B2 * | 11/2006 | Okada | ............................ | 340/427 |
| 7,438,159 B2 * | 10/2008 | Watarai | ....................... | 188/24.12 |
| 7,448,297 B2 * | 11/2008 | Tiong | ............................ | 74/551.8 |
| 7,490,700 B2 * | 2/2009 | Watarai | ....................... | 188/24.11 |
| 7,778,023 B1 * | 8/2010 | Mohoney | ................. | 361/679.41 |
| 7,779,724 B2 * | 8/2010 | Fujii | ............................. | 74/551.8 |
| 7,988,344 B2 * | 8/2011 | Ma et al. | ....................... | 362/474 |
| 2004/0069090 A1 * | 4/2004 | Iteya | ............................. | 74/551.8 |
| 2006/0108183 A1 * | 5/2006 | Watarai | ......................... | 188/2 D |
| 2008/0304221 A1 | 12/2008 | Ueda | | |
| 2010/0208421 A1 * | 8/2010 | Chih et al. | ............... | 361/679.26 |

FOREIGN PATENT DOCUMENTS

| | | | |
|---|---|---|---|
| DE | 102004044545 A1 * | 3/2006 | |
| DE | 102005041442 A1 * | 4/2007 | |
| EP | 1231623 A1 | 8/2002 | |
| EP | 1630095 A2 | 3/2006 | |

OTHER PUBLICATIONS

Michele Squeri, European Search Report from corresponding European Patent Application No. EP10172334, Dec. 17, 2010.

* cited by examiner

*Primary Examiner* — Lisa Lea Edmonds
(74) *Attorney, Agent, or Firm* — Hoffman & Baron, LLP

(57) ABSTRACT

There is provided an improved solution for a user interface of a cycling computer user interface unit and an improved solution for mounting a cycling computer to a bicycle. The user interface solution comprises a swing switch rotating about a shaft and the mounting solution comprises a cross element enabling mounting in 90 degree resolution.

14 Claims, 6 Drawing Sheets

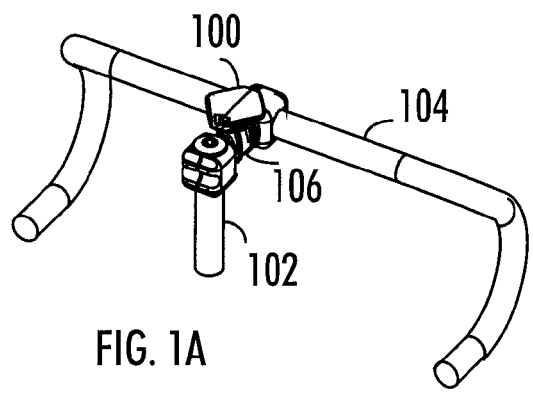
FIG. 1A
FIG. 1B
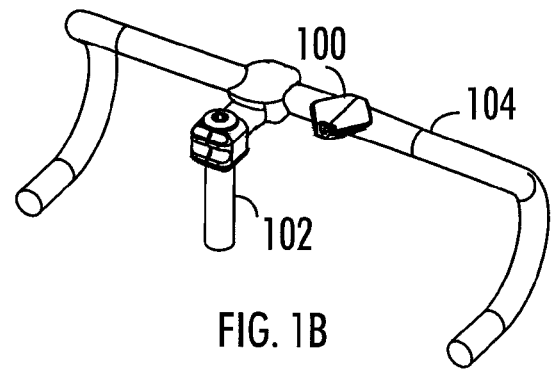
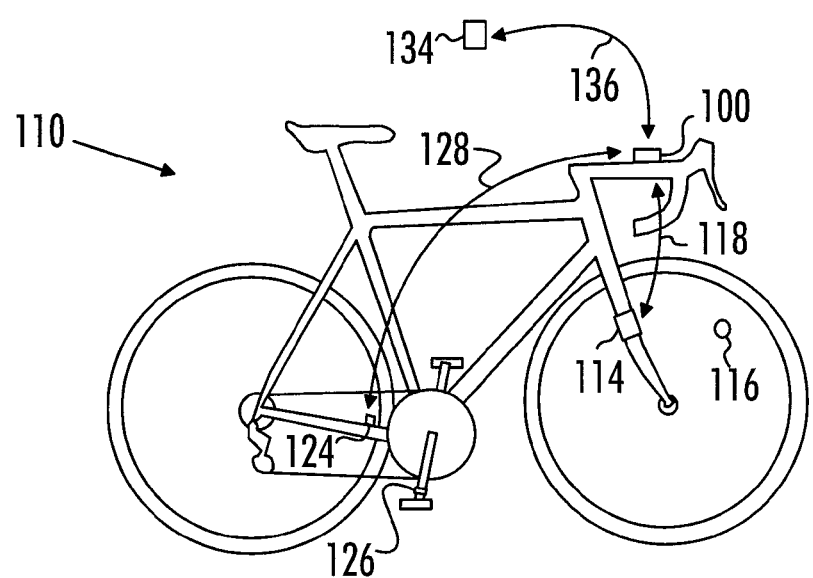
FIG. 1C

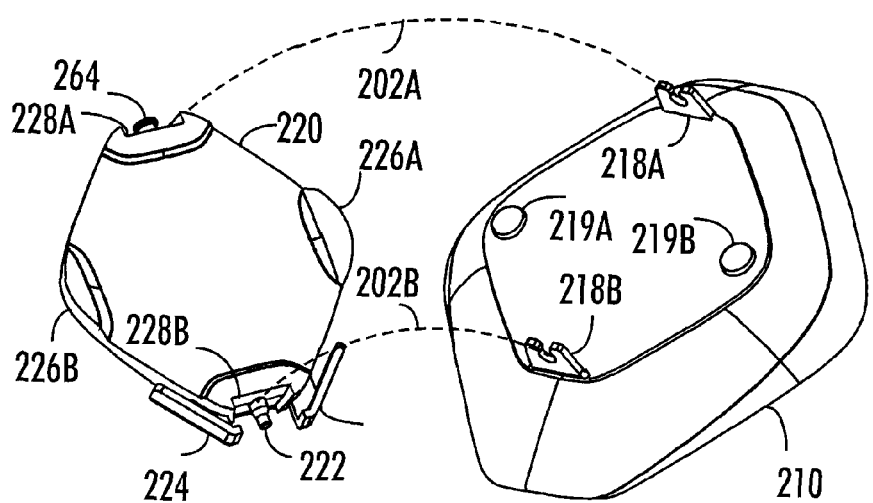
FIG. 3
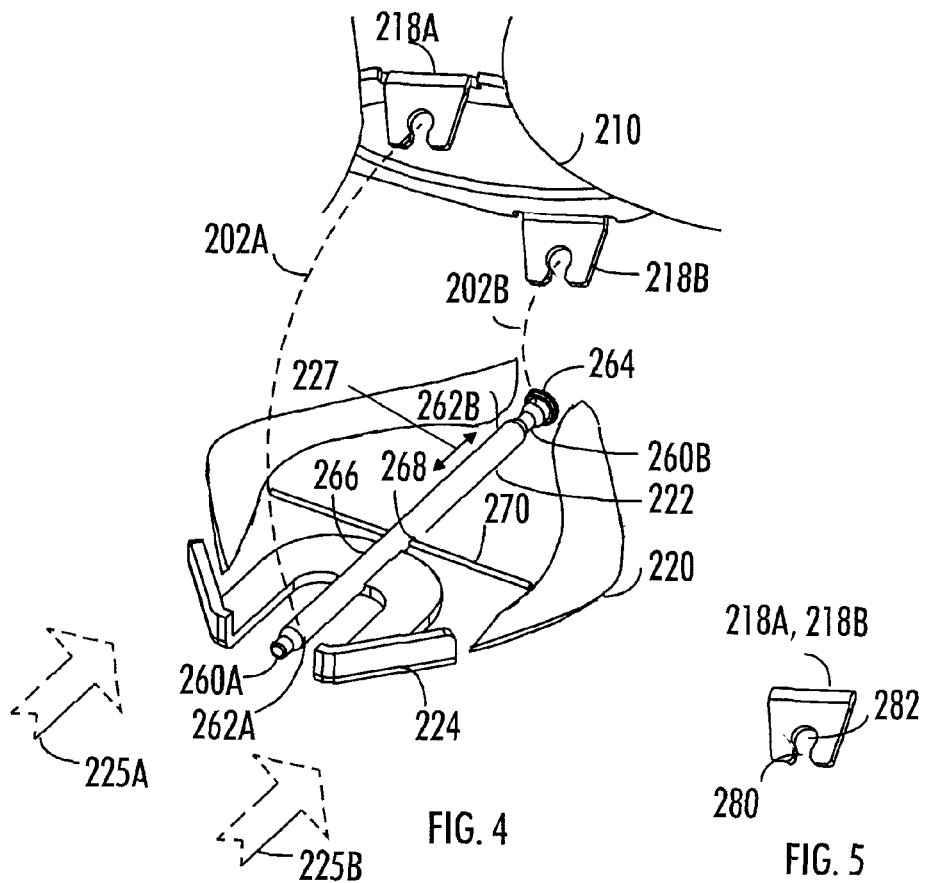
FIG. 4
FIG. 5

CYCLING COMPUTER ATTACHING MECHANISM AND METHOD

CROSS-REFERENCE TO RELATED APPLICATION

This application claims priority based on Finnish Patent Application No. 20095888, filed Aug. 28, 2009, which is incorporated herein by reference.

BACKGROUND

1. Field

The invention relates generally to a cycling computer system. More particularly, the invention relates to a user interface of a cycling computer user interface unit and an attaching mechanism for attaching the cycling computer user interface unit to a bicycle.

2. Description of the Related Art

Nowadays people are aware of the importance of exercising on a person's health. One way to obtain more knowledge about a performed training event is via an exercise computer. The exercise computer displays information about, for example, one's heart rate by using a heart rate sensor that communicates the heart rate information to the heart rate monitor.

A cycling computer is basically a modification or an extension of a simple exercise computer. In addition to or in stead of the heart rate information, a cycling computer is capable of showing numerous other pieces of information related to the exercise activity. For instance, the cycling computer may display information about speed, cadence, pedaling power, or time-related information, such as lap times, etc.

A typical place to wear the exercise computer whilst running is on a wrist of the jogger. However, a cyclist may find it more comfortable to wear the cycling computer in location other than the wrist, for example attached to the frame of the bicycle so as to obtain an effortless visual sight of the computer. For this reason, there are bases for the cycling computer that enable attachment of the cycling computer to the bicycle. However, current bases offer only very limited mounting possibilities to the bicycle, i.e., the user cannot freely select the location where to install the base.

Further, small buttons that form the current user interface of the cycling computer are rather cumbersome to use and may cause problems whilst biking of high speed.

Accordingly, improved solutions for proving an easy-to-use interface for the cycling computer and effortless installation of the base to the bicycle and the cycling computer to the base are needed.

SUMMARY

An object of the invention is to provide improved solutions for the user interface of a cycling computer and for installing a base to a bicycle and mounting the cycling computer to the base.

According to an aspect of the invention, there is provided an apparatus as specified in claim 1.

According to another aspect of the invention, there are provided methods as specified in claims 13 and 14.

Embodiments of the invention are defined in the dependent claims.

BRIEF DESCRIPTION OF THE DRAWINGS

In the following, the invention will be described in greater detail with reference to the embodiments and the accompanying drawings, in which FIGS. 1A and 1B present possible mounting locations of a cycling computer to a bicycle according to embodiments;

FIG. 1C illustrates a cycling computer system, according to an embodiment;

FIG. 3 shows the attachment of a cycling computer user interface unit to a base according to an embodiment;

FIG. 4 illustrates the attachment of the cycling computer user interface unit to the base in more detail, according to an embodiment;

FIG. 5 illustrates a fastening element of the cycling computer user interface unit according to an embodiment;

DETAILED DESCRIPTION

Figure 2:
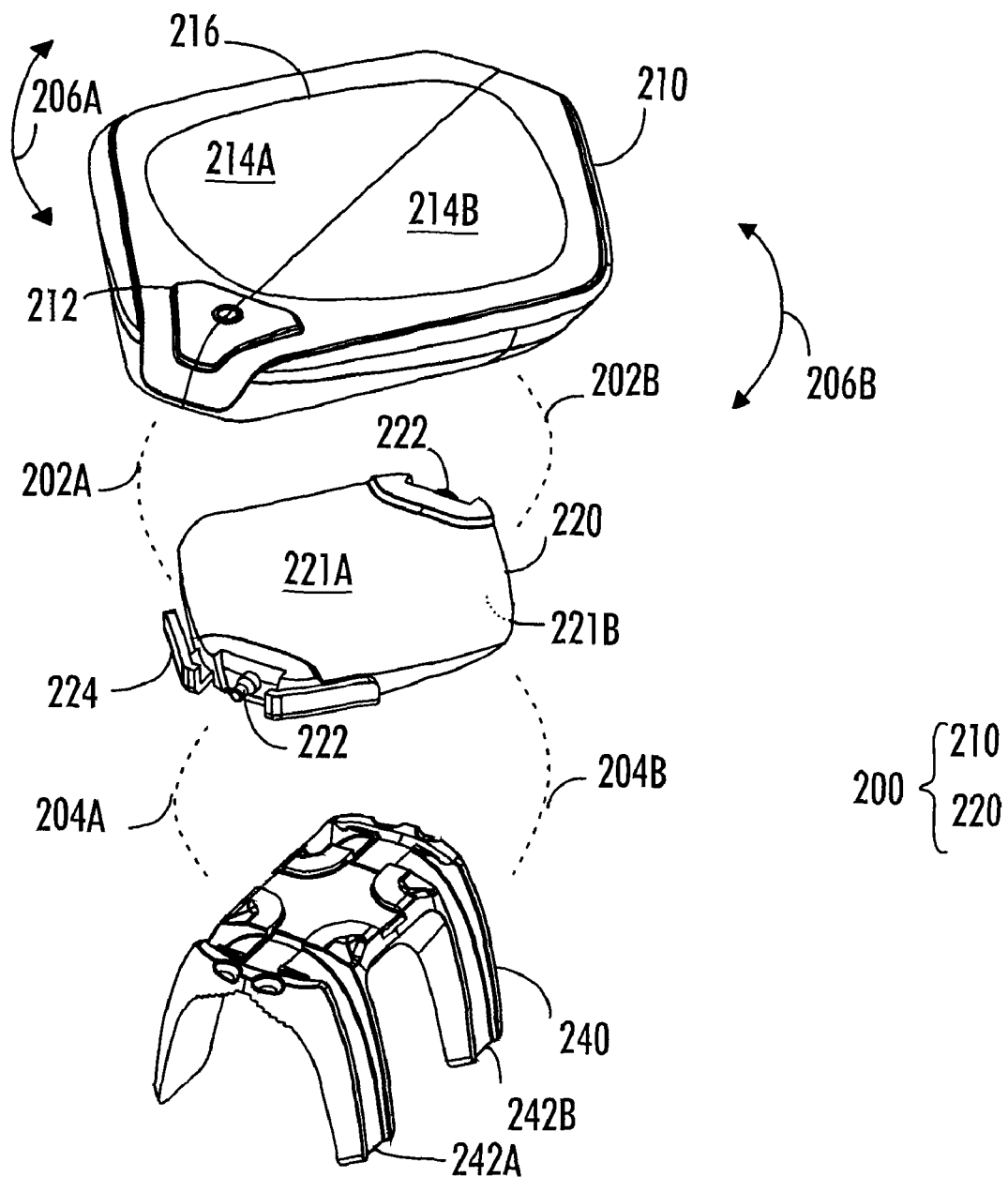
FIG. 2 shows the cycling computer according to an embodiment.

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

FIGS. 1A and 1B show two exemplary placements of a cycling computer 100 to a bicycle. As shown in FIG. 1A and according to an embodiment, the cycling computer 100 is attached to the stem 106 of the bicycle. The stem 106 is used to connect a steering tube 102 of the bicycle and a handlebar 104 of the bicycle. Alternatively, as shown in FIG. 1B, according to another embodiment, the cycling computer 100 is attached to the handlebar 104 of the bicycle. The handlebar 104 may be of any form. That is, it does not need to be of the form shown in FIGS. 1A and 1B but straight handlebars 104 are suitable as well, for example.

As can be seen in FIGS. 1A and 1B, the attachment of the cycling computer 100 to the bicycle provides good view from a cyclist to the cycling computer 100 when the cyclist is cycling on the bicycle. Further, the cyclist may freely choose the location on which he/she wishes to mount the cycling computer 100. After all, different cyclists have different biking styles which plays a role in selecting the optimal mounting location. For instance, a person may want to cycle in such a way that he/she rests his/her arms on the handlebar 104 of the bicycle thereby blocking a visual connection to the monitor in a case the cycling computer 100 is mounted to the handlebar 104. In this case, the mounting option of FIG. 1A is more suitable. The specific attachment structure of the cycling computer 100 to the bicycle will be discussed later.

FIG. 1C shows the cycling computer system according to an embodiment. The cycling computer system may be attached to a bicycle 110. The cycling computer system may also comprise a speed measuring unit 114, 116. The speed measuring unit may comprise two parts, a speed detector 114, and a speed inductor 116. This may be implemented in such a manner that a wheel speed sensor 114 is placed on the right fork, and a wheel speed magnet 116 is placed on a spoke (for the sake of clarity, spokes are not illustrated in FIG. 1C). Speed information is obtained from the wheel speed sensor 114 as the wheel speed magnet 116 passes it. The speed detector 114 may transmit the wireless speed signal 118 to the cycling computer 100.

The cycling computer system may also comprise a cadence measuring system 124, 126. The cadence measuring system may comprise two parts, a cadence detector 126, and a cadence inductor 124. This may be implemented in such a manner that a cadence magnet 126 is placed on the right crank, and the crank speed detector 124 is mounted on the right chain stay. Cadence information is obtained from the crank speed detector 124 as the cadence magnet 126 passes it. A wireless cadence signal 128 may be transmitted to the cycling computer 100.

The cycling computer system may also comprise a heart activity measurement unit 134. The heart activity measurement unit 134 may be strapped around the chest of the cyclist, for example. The heart activity measurement unit 134 may produce heart activity information, such as a heart rate. The heart activity measurement unit 134 may transmit the wireless heart activity signal 136 to the cycling computer 100.

Furthermore, besides bicycle, the cycling computer system may be installed to any human-powered vehicle, such as a unicycle, a tricycle, a quadricycle, a recumbent, a stationary exercise-bike, etc.

The apparatus, such as the cycling computer 200, shown in FIG. 2 comprises a cycling computer user interface unit 210 and a base 220. Further, the cycling computer 200 may comprise a stabilizing element 240.

The cycling computer user interface unit 210 may receive exercise information from various instruments as shown in FIG. 1C via a suitable proprietary or standard wireless communication means utilizing electric and/or magnetic fields. Examples of proprietary communication means is Polar WIND radio transmission technology operating at 2.4 GHz and Polar 5 kHz inductive based transmission technology. Examples of standard transmission technologies are Blue-Tooth, ANT and BlueTooth Low-Energy. In addition, a wired information transmission is possible as well.

The cycling computer user interface unit 210 may comprise a display 216 that is used to display exercise information to the cyclist. The display 216 may be a liquid crystal display, for example. The display 216 may show information in various means. The information may be displayed win letters or numerals, for example. Further, a LED (Light Emitting Diode) may be used to illustrate certain type of information to the cyclist. The information may be expressed by the colour of the LED or the blinking frequency of the LED. The cycling computer user interface unit 210 may also comprise a speaker used to output audio sounds for informing the cyclist about a high heart beat rate, low speed, etc.

The cycling computer 200 may comprise a processor. The processor may be implemented with a separate digital signal processor provided with suitable software embedded on a computer readable medium, or with separate logic circuit, such as an application specific integrated circuit (ASIC).

The cycling computer 200 may further comprise a memory operatively connected to the processor. The processor may further comprise an interface for providing communication capabilities. The memory may be located at the cycling computer user interface unit 210. For example, the information stored in the memory of the cycling computer user interface unit 210 may be transferred to a personal computer, if desired. The transfer may be wireless and it may utilize the Bluetooth® standard, or any other suitable standard/non-standard wireless communication means.

The cycling computer user interface unit 210 can be virtually divided in two parts in horizontal plane as shown with reference numerals 214A and 214B. The contact areas 214A and 214B may be used to control the cycling computer user interface unit 210 as will be described later. That is, the contact areas 214A and 214B form the user interface of the cycling computer user interface unit 210.

Further, the cycling computer user interface unit 210 may comprise at least one button 212 that is used for further controlling the cycling computer user interface unit 210. The at least one button 212 may be located anywhere in the cycling computer user interface unit 210, i.e., it does not have to be in the location as specified by FIG. 2.

The base 220 of FIG. 2 serves as a bike mounting structure for the cycling computer user interface unit 210. The base is thus used to attach the cycling computer user interface unit 210 to the bicycle, as explained with reference to FIGS. 1A and 1B. According to an embodiment, the base 220 comprises a body having an upper side 221A and a lower side 221B. The apparatus 200 of FIG. 2 may further comprise a fastening structure enabling the base 220 to be attached to the bicycle, the fastening structure being on the lower side 221B of the base 220. The upper side 221A and the lower side 221B may be attached to each other with screws or the like. The different mechanism that may be at least partly inside the base 220 will be explained later with reference to FIG. 4.

Referring to FIGS. 2, 3 and 4, the apparatus 200 further comprises a shaft 222 attaching the cycling computer user interface unit 210 to the base 220, wherein the shaft 222 penetrates at least part of the base 220 and, when attached, the fastening elements 218A and 218B of the cycling computer user interface unit 210. The shaft 222 may thereby enable the attachment of the cycling computer user interface unit 210 to the base 220 such that lower side of the cycling computer user interface unit 210 faces the upper side 221A of the base 220.

The shaft 222 does not have to penetrate the whole body of the base 220 as shown in Figures, but the shaft 222 may penetrate only part of the body. For example, the base 220 may have an opening on the upper side 221A of the base through which the shaft 222 is accessible. Thus, the fastening element 218A or 218B may be attached to the shaft 222 at the opening of the base 220. Dotted lines 202A and 202B illustrate the way the fastening elements 218A and 218B are attached to the shaft 222, according to an embodiment.

According to an embodiment, the cycling computer user interface unit 210, when attached to the base 220, serves as a swing switch such that the cycling computer user interface unit 210 has a limited rotational degree of freedom about the shaft 222 as shown with reference numerals 206A and 206B in FIG. 2. Further, when the cycling computer user interface unit 210 is rotated about the shaft 222, a function of the cycling computer user interface unit 210 is performed. The function may be, for example, to change view of the display 216 of the cycling computer user interface unit 210.

According to an embodiment, when the cycling computer user interface unit 210 is rotated about the shaft 222, at least one switch button becomes pressed between the base 220 and the cycling computer user interface unit 210, thereby causing a function of the cycling computer user interface unit 210 to be performed.

According to another embodiment, the function may be triggered due to the rotation of at least part of the shaft 222 in case where the cycling computer user interface unit 210 is attached to the shaft 222 with such tightness that the rotational movement of the cycling computer user interface unit 210 rotates also the shaft 222.

Alternatively, the cycling computer user interface unit 210 may be equipped with a balance detector and when the cycling computer user interface unit 210 is not in a predetermined rotational balance, a desired function is performed. The function to be performed may further depend on which direction the cycling computer user interface unit 210 is rotated. Rotating the cycling computer user interface unit 210 to the left may cause one function and rotation to the right may cause another function to be performed.

The at least one switch button may be located on the lower side of the cycling computer receiver 210, that is, on the side that faces the base 220 when the cycling computer receiver 210 is attached to the base 220. This case is shown in FIG. 3 with reference numerals 219A and 219B. However, there may be only one switch button 219A or 219B.

Further, the base 220 may comprise at least one elevated counter part 226A and 226B on the upper side 221A of the base 220 such that when the cycling computer user interface unit 210 is rotated about the shaft 222 in either direction, a switch button 219A or 219B becomes pressed between the counter part 226A or 226B and the cycling computer user interface unit 210, thereby causing a function of the cycling computer user interface unit 210 to be performed. However, the presence of the elevated counter parts 226A and 226B is not mandatory.

Alternatively, the at least one switch button may be located on the upper side 221A of the base 220. In this case, there is an electric connection between the base 220 and the cycling computer receiver 210 when they are attached to each others, thereby enabling information transfer between the base 220 and the cycling computer user interface unit 210.

The swing switch has, according to an embodiment, a swing function in both rotational directions and at least one switch button for each rotational direction. The cycling computer user interface unit 210 can be rotated about the shaft 222, for example, by pressing either contact area 214A or contact area 214B on the upper side of the cycling computer user interface unit 210. That is, the swing function in either rotational direction is generated by pressing either contact area 214A or contact area 214B of the upper side of the cycling computer user interface unit 210. For example by pressing the part 214B, the other part 214A is elevated since the cycling computer user interface unit 210 is rotating about the shaft 222. The switch button 219B locating between the base 220 and the part of the lower side of the cycling computer user interface unit 210 corresponding to the contact area 214B of the upper side of the cycling computer user interface unit 210 becomes pressed, thereby causing a desired function of the cycling computer user interface unit 210 to be performed.

The double swing switch structure enables easy to use interface through which at least two different functions can be performed. According to an embodiment, one advantage is that when a cyclist presses either contact area 214A or 214B, he/she does not have to pay attention to the strength of the pressure. One button performs one function regardless how strongly the cyclists presses the contact area 214A or 214B.

According to another embodiment, the function of the at least one switch button 219A and 219B may be such that a strong pressure causes one function and a weaker pressure causes another function. That is, a switch button 219A and 219B may offer two different functions, one function when the switch button 219A and 219B becomes pressed with a force lower than a predetermined threshold, and another function when the switch button 219A and 219B becomes pressed with a force higher than or equal to the predetermined threshold. This way the two switch buttons 219A and 219B of the double swing switch may offer four different functions of the cycling computer user interface unit 210 to be performed.

However, the shaft 222 does not have to be on the horizontal middle of the base 220 and the cycling computer user interface unit 210 even though so shown in Figures. Alternatively, the shaft 222 may be, for example, on the left side of the base 220 when seen from the top of the base 220. Similarly, the fastening elements 218A and 218B may not have to be located such that the shaft 222 divides the cycling computer user interface unit in half when attached. In that case, the contact areas 214A and 214B may be of different sizes and the rotational origo of the rotational degree of freedom may be in other place than in the horizontal middle of the cycling computer user interface unit 210 when seen from the top of the cycling computer user interface unit 210.

A rotational balance of the swing switch may be determined by the at least two non-pressed switch buttons 219A and 219B located on the opposite sides of the shaft 222 and between the cycling computer user interface unit 210 and the base 220. The weight or the pressure of the cycling computer user interface unit 210 does not press the switch buttons 219A and 219B by itself. Accordingly, in a rest position, the switch buttons 219A and 219B and the shaft 222 offer three supporting points for the cycling computer user interface unit 210, thereby giving the cycling computer user interface unit 210 a rotational balance. When the cyclist presses the either contact area 214A or 214B, the corresponding switch button 219A or 219B becomes pressed and when the cyclist releases the pressure from the contact area 214A or 214B, the spring force of the switch button 219A or 219B restores the cycling computer user interface unit 210 in its rotational balance, i.e., in its rest position.

When there is only one switch button 219A or 219B, the rotational balance can be obtained in similar manner. However, in this case there is only two supporting points for the cycling computer user interface unit 210.

The locations of the at least one switch button 219A and 219B may not have to be as shown in FIG. 3. They do not have to be symmetric with respect to the shaft 222 nor do they have to be edges of the lower side of the cycling computer user interface unit 210. That is, their locations may be selected as required.

The cycling computer 200 may further comprise at least one guidance slot 228A and 228B introduced into the body of the base 220 so as to guide the fastening elements 218A and 218B of the cycling computer user interface unit 210 around the shaft 222. This is shown in FIG. 3. The at least one guidance slot 228A and 228B may be introduced to the shaft 222 via engraving or molding, for example. The at least one guidance slot 228A and 228B may be downwardly narrowing, located close to the points of the shaft 222 around which the fastening elements 218A and 218B are placed. By downwardly narrowing it is understood that the guidance slots 228A and 228B are wider on the upper side 221A side and narrower on the lower side 221B side of the base 220. They are advantageous because when a person is attaching the cycling computer user interface unit 210 to the base 220, the at least one guidance slot 228A and 228B direct the fastening elements 218A and 218B around the shaft 222. That is, even though the person could not see the attachment places on the shaft 222, the at least one guidance slot 228A and 228B would direct the fastening elements 218A and 218B around the shaft 222 properly. However, different forms of guidance slots 228A and 228B are optional as long as they are helpful in directing the fastening elements 218A and 218B around the shaft 222.

According to an embodiment, as shown in FIG. 4, the shaft 222 may be a circular and straight pin-like element. The shaft 222 comprises a circularly widened extension 264 at one point on the shaft 222, wherein the circularly extension 264 keeps the shaft 222 from sliding through the body of the base 220 in one direction by becoming pressed against the body of the base 220. The circularly widened extension 264 may be at the other end of the shaft 222 or in other point of the shaft 222 provided that the circularly widened extension 264 can become pressed against the body of the base 220. In an embodiment where the circularly widened extension 264 is at the other end of the shaft 222, FIG. 3 shows how the circularly widened extension 264 becomes pressed against the body of the base 220.

According to an embodiment, the shaft 222 further has a longitudinal degree of freedom as shown with a reference numeral 227 in FIG. 4 that is limited in one direction by the circularly widened extension 264 and in other direction by a force of a spring 270, wherein the spring 270 may restore the shaft 222 in a position where the circularly widened extension 264 becomes pressed against the body of the base 220, i.e., the rest position of the shaft 222. The shaft 222 may have an engraving 268 that holds the spring 270 attached to the shaft 222. The spring 270 and the shaft 222 are connected at the engraving 268. For example, half of the circular width of the shaft 222 may be engraved to make a nest for the spring 270.

Further, the shaft 222 may have circularly narrowed necks 260A and 260B on at least two points on the shaft 222, wherein at least one neck 260A or 260B is inside the base 220 when the shaft 222 is in the position where the circularly widened extension 264 becomes pressed against the body of the base 220, that is, in its rest position. The necks 260A and 260B may be engraved to the shaft 222. They may be located as shown in FIG. 4, so that the neck 260A is at one end of the shaft 222. However, the necks 260A and 260B may also be located in other parts of the shaft 222 and it is possible that both of the necks 260A and 260B go inside the base 220 in the rest position.

The cycling computer 200 may further comprise a projection member 224 for moving the shaft 222 in the direction of the longitudinal degree of freedom when the projection member 224 is pressed as shown with reference numerals 225A and 225B so as to bring out the at least one neck 260A and 260B from the base 220. As the projection member 224 is pressed to the direction of the arrows 225 and 225B, the shaft 222 moves towards the same direction. The force of the spring 270 is adjusted such that the spring 270 limits the amount of movement of the shaft 222. The limitation may be such that when the at least one neck comes out of the base 220, the force of the spring 270 limits or stops the movement of the shaft 222. When the projection member 224 is released, the force of the spring 270 restores the shaft 222 to the rest position, i.e., the position when the circularly widened extension 264 becomes pressed against the body of the base 264. The projection member 224 may be of the form shown in FIG. 4 or the form of the projection member may be something else capable of moving the shaft 222.

The shaft 222 may have an engraving 266 so as to attach the shaft 222 to the projection member 224 as shown in FIG. 4. For example, half of the circular width of the shaft 222 may be engraved to make a nest for the projection member 224.

According to an embodiment, the fastening elements 218A and 218B are U-shaped such that upper part of the U-shaped fastening element 218A and 218B has a narrow opening 280 and the bottom part of the U-shaped fastening element 218A and 218B has a wide opening 282, as shown in FIG. 5. The necks 260A and 260B of the shaft 222 are matched to the narrow openings 280 at the upper part of the U-shaped fastening elements 218A and 218B of the cycling computer user interface unit 210. Similarly, at least two parts 262A and 262B of the shaft 222 are matched to the wide openings 282 at the bottom part of the U-shaped fastening elements 218A and 218B of the cycling computer user interface unit 210. By matching it is understood that the circular width of the shaft 222 corresponds to the narrow opening 280 or to the wide opening 282 of the fastening element 218A and 218B. More specifically, the virtual diameter of the narrow opening 280 is shorter than the diameter of the at least two parts 262A and 262B of the shaft 222. This is advantageous, because then the shaft 222 cannot come out of the fastening elements 218A and 218B once attached to each other.

Accordingly, the fastening elements 218A and 218B are placed around the shaft 222 through the necks 260A and 260B when the projection member 224 is pressed, that is, when both of the necks 262A and 260B are accessible and outside the body of the base 220. In other words, the fastening elements 218A and 218B are placed around the shaft through the necks 260A and 260B but the final fastening position is such that the wide openings 282 of the fastening elements 218A and 218B are around the parts 262A and 262B of the shaft 222. When the fastening elements 218A and 218B are around the shaft 222, the at least one neck 260A and 260B of the shaft 222 slides into the base 220 as the projection member 224 is released due to the force of the spring 270. At the same time, the parts 262A and 262B of the shaft 222 matched to the wide openings 280 of the fastening elements 218A and 218B slide inside the wide openings 280.

As a result, the at least one fastening element 218A or 218B is pressed between the body of the base 220 and the circularly widened extension 264 of the shaft 222, thereby holding the cycling computer user interface unit 210 tightly attached to the base 220. The fact that the at least one fastening element 218A or 218B is pressed between the body of the base 220 and the circularly widened extension 264 of the shaft 222 prevents the cycling computer user interface unit 210 from sliding through the shaft 222. Further, the narrow opening 280 of the fastening element 218A and 218B prevents the shaft 222 from coming out of the fastening element 218A and 218B.

FIG. 2 further shows a stabilizing element 240 equipped with at least one fastening strap guide 242A and 242B. Dotted lines 204A and 204B illustrate that the stabilizing element 240 is placed underneath the base 220. The function of the stabilizing element is to prevent vibration of the cycling computer system 200 when the cycling computer system 200 is mounted on the bicycle and the bicycle is moving. The base 220 is attached to the bicycle with at least one fastening strap. Accordingly, the stabilizing element 240 is placed between the at least one fastening strap and a bicycle so as to prevent vibration of the cycling computer user interface unit 210.

Figure 6:
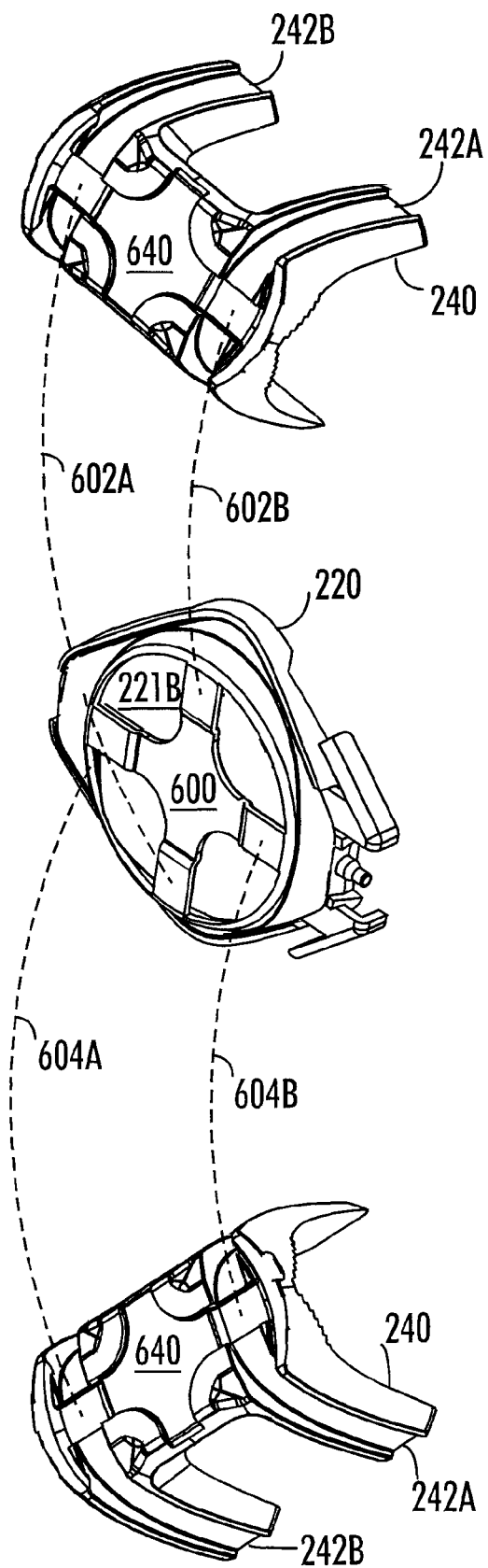
FIG. 6 shows how the stabilizing element is used according to an embodiment.

FIG. 6 shows the lower side 221B of the base 220. The lower side 221B comprises a fastening structure enabling the base 220 and, thus, the cycling computer 200, to be attached to the bicycle. The fastening structure comprises a cross element 600 with an elevated part in each crossarm so as to allow a fastening strap to pass between a crossarm and the lower side 221B. According to an embodiment, the cross element 600 has at least four crossarms, but the number of crossarms may be more, for example, two crossarms for each of the four directions.

FIG. 6 further shows the stabilizing element 240 in more detail. The stabilizing element has a center member 640 that is matched to the cross element 600 of the base 220. That is, the center member 640 may be engraved or molded to match the elevated parts and non-elevated parts of the crossarms of the cross element 600.

The cross element 600 allows the base 220 to be placed on the stabilizing element 240 in 90 degree resolution. That is, dotted lines 602A and 602B show one way of placing the stabilizing element 240 and the base 220 on top of each other. Dotted lines 604A and 604B show another possible way in which the stabilizing element 240 is turned 90 degrees with respect to the base 220. This way the cycling computer system may be mounted to the bicycle in various places still keeping the cycling computer user interface unit at suitable angle to the cyclist. Referring to FIGS. 1A and 1B, the cross element enables the cycling computer system 100 to be attached to the stem 106 of the bicycle. Alternatively, according to another embodiment, the cycling computer system 100 can be attached to the handlebar 104 of the bicycle.

Figure 7A:
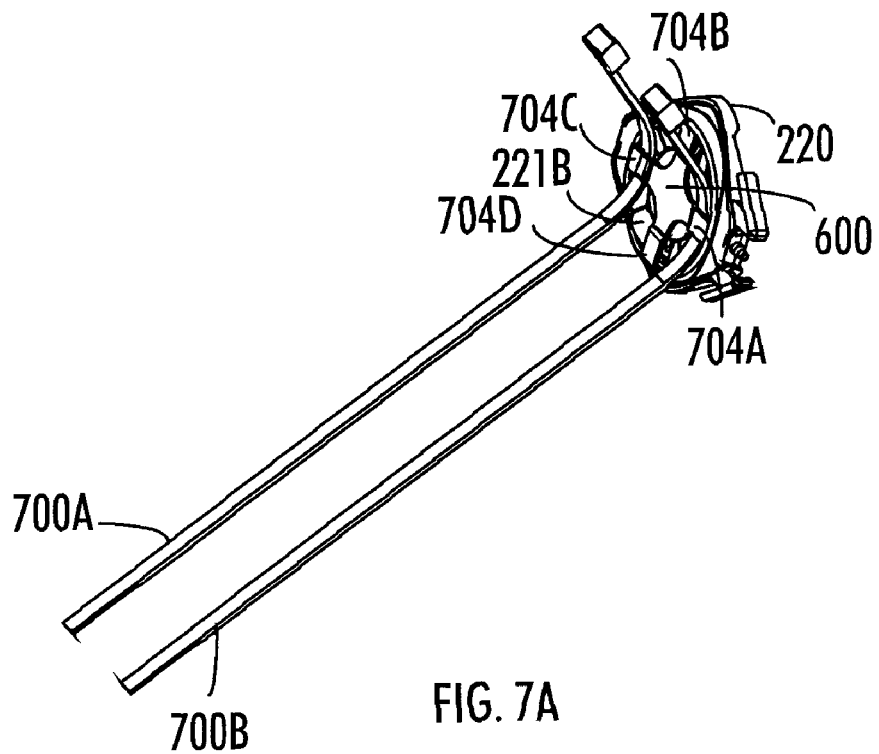
FIGS. 7A and 7B illustrate the use of fastening straps according to an embodiment.
Figure 7B:
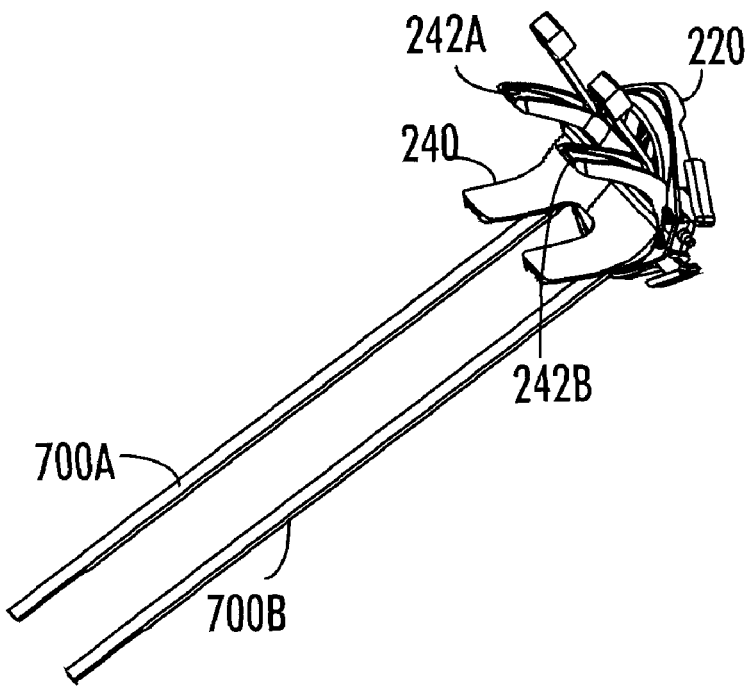

FIGS. 7A and 7B further illustrate the way the stabilizing element 240, the cross element 600 and the fastening straps 700A and 700B are used. As shown, according to an embodiment, the cross element 600 has four crossarms, each with an elevated part 704A to 704D. The fastening strap 700A passes between the lower side 221B of the base 220 and the elevated part 704C. Similarly, the fastening strap 700B passes between the lower side 221B of the base 220 and the elevated part 704A. If the 90 degrees change to the mounting of the cycling computer system to the bicycle were performed, the fastening straps 700A and 700B would pass between the lower side 221B of the base 220 and the elevated parts 704B and 704D, respectively.

In FIG. 7B, the stabilizing element 240 is introduced to the arrangement of FIG. 7A. The stabilizing element 240 is placed so that the fastening straps 700A and 700B run via the fastening strap guides 242A and 242B. Further, the stabilizing element 240 is placed so that it surrounds at least partly the place in the bicycle where the cycling computer system is mounted.

According to an embodiment, a cycling computer system 200 comprises a cycling computer user interface unit 210 and the base 220 for attaching the cycling computer user interface unit 210 to a bicycle. The cycling computer user interface unit 210 is mechanically matched to the base 220 so as to allow the attachment of the cycling computer user interface unit 210 to the base 220.

Figure 8:
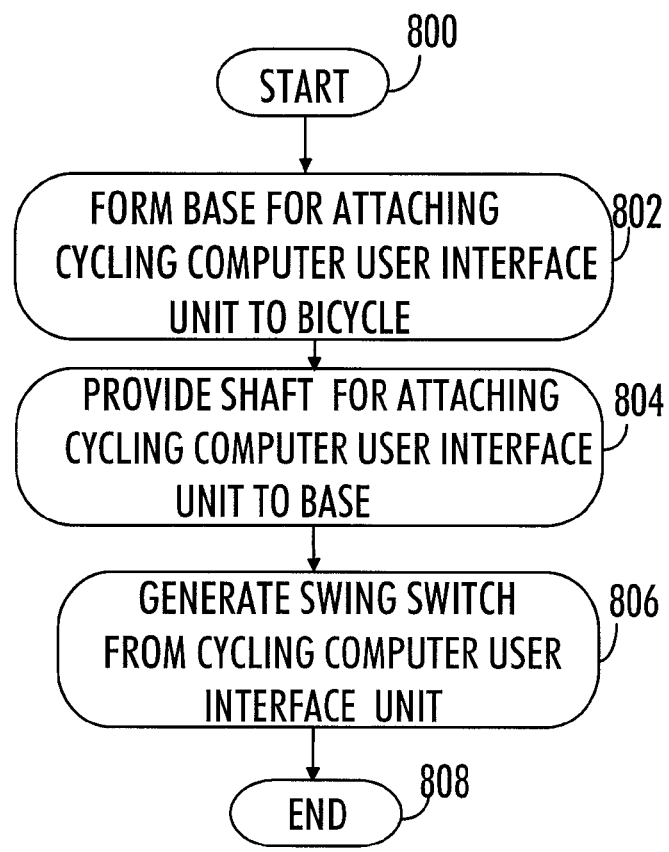
FIG. 8 illustrates a method for generating the user interface of the cycling computer according to an embodiment.

FIG. 8 illustrates a method for generating the user interface of the cycling computer. The method begins in step 800. Step 802 comprises forming a base for attaching a cycling computer user interface unit to a bicycle. In step 804, a shaft for attaching the cycling computer user interface unit to the base is provided such that the shaft, that penetrates at least part of a body of the base, penetrates also the fastening elements of the cycling computer user interface unit. Accordingly the base and the cycling computer user interface unit become attached to each other. Step 806 comprises generating a swing switch from the cycling computer user interface unit when attached to the base, wherein the cycling computer user interface unit has a limited rotational degree of freedom about the shaft (222) and when the cycling computer user interface unit is rotated about the shaft, a function of the cycling computer user interface unit is performed. The method ends in step 808.

Figure 9:
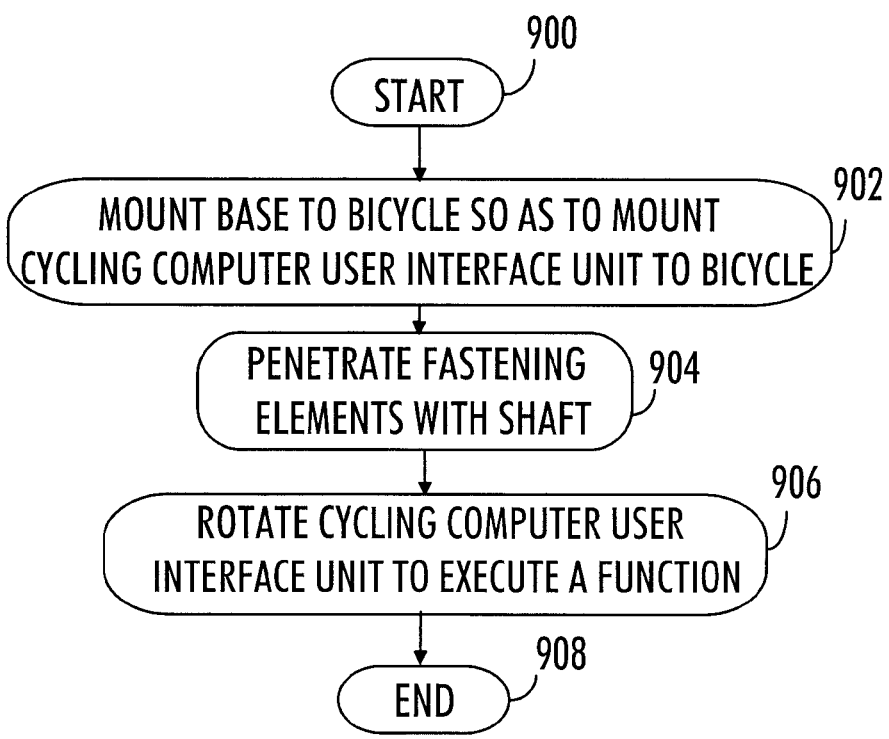
FIG. 9 illustrates a method for operating the user interface of the cycling computer according to an embodiment.

FIG. 9 illustrates a method for operating the user interface of the cycling computer. The method begins in step 900. Step 902 comprises mounting a base to a bicycle so as to mount a cycling computer user interface unit to the bicycle via the base. In step 904 the method comprises penetrating fastening elements of the cycling computer user interface unit with a shaft, wherein the shaft is attached to the base in order to attach the base and the cycling computer user interface unit to each other. However, the order of steps 902 and 904 may be switched, that is the cycling computer user interface unit may be attached to the base first and then the combination of the base and the cycling computer user interface unit may be mounted to the bicycle. In step 906 rotating the cycling computer user interface unit about the shaft in order to execute a function of the cycling computer user interface unit takes place. More particularly, the cycling computer user interface unit serves as a swing switch when attached to the base by having a limited rotational degree of freedom about the shaft. The method ends in step 908.

The embodiments of the invention offer many advantages. The user interface becomes easy to use since an effective button area may comprise virtually half of the upper side of the cycling computer user interface unit as shown in FIG. 2. In other words, parts of the upper side of the cycling computer (comprising the display) serve as large buttons. This way, the cyclist can easily control the cycling computer user interface unit, for example, the settings of the cycling computer user interface unit or the display of the cycling computer user interface unit. Further, the cross element fastening structure offers freedom in mounting the cycling computer system to the bicycle. The mounting possibilities include mounting in 90 degree resolution. Further, the mechanical solution of the cycling computer system is very durable and flat due to the swing switch structure.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. An apparatus, comprising:
   a cycling computer user interface unit;
   a base for attaching the cycling computer user interface unit to a bicycle;
   a fastening structure configured to enable the base to be attached to the bicycle, the fastening structure being on a lower side of the base; and
   a shaft configured to attach the cycling computer user interface unit to the base, wherein the shaft penetrates at least part of a body of the base and, when attached, fastening elements of the cycling computer user interface unit, wherein the cycling computer user interface unit, when attached to the base, is configured to serve as a swing switch such that the cycling computer user interface unit has a limited rotational degree of freedom about the shaft, and when the cycling computer user interface unit is rotated about the shaft, a function of the cycling computer user interface unit is performed.

2. The apparatus of claim 1, further comprising at least one elevated counter part on an upper side of the base such that when the cycling computer user interface unit is rotated about the shaft in either direction, a switch button becomes pressed between a counter part and the cycling computer user interface unit, thereby causing a function of the cycling computer user interface unit to be performed.

3. The apparatus of claim 1, wherein the swing switch has a swing function in both rotational directions and at least one switch button for each rotational direction, wherein the swing function in either rotational direction is generated by pressing either half of the upper side of the cycling computer user interface unit, and a rotational balance of the swing switch is determined by the at least two non-pressed switch buttons located on the opposite sides of the shaft and between the cycling computer user interface unit and the base.

4. The apparatus of claim 1, wherein a switch button offers two different functions, one function when the switch button becomes pressed with a force lower than a predetermined threshold, and another function when the switch button becomes pressed with a force higher than or equal to the predetermined threshold.

5. The apparatus of claim 1, wherein the shaft further comprises a circularly widened extension at one point on the shaft, wherein the circularly widened extension is configured to prevent the shaft from sliding through the base in one direction by becoming pressed against the body of the base.

6. The apparatus of claim 5, wherein the shaft further has a longitudinal degree of freedom that is limited in one direction by the circularly widened extension and in other direction by a force of a spring, wherein the spring is further configured to restore the shaft in a position where the circularly widened extension becomes pressed against the body of the base.

7. The apparatus of claim 6, wherein the shaft has circularly narrowed necks on at least two points on the shaft, wherein at least one neck is inside the base when the shaft is in the position where the circularly widened extension becomes pressed against the body of the base.

8. The apparatus of claim 7, further comprising a projection member configured to move the shaft in the direction of the longitudinal degree of freedom when the projection member is pressed so as to bring out the at least one neck from the body of the base.

9. The apparatus of claim 7, wherein the necks of the shaft are matched to the narrow openings at the upper part of U-shaped fastening elements of the cycling computer user interface unit and at least two parts of the shaft are matched to the wide openings at the bottom part of the U-shaped fastening elements of the cycling computer user interface unit.

10. The apparatus of claim 1, further comprising at least one guidance slot introduced into the body of the base so as to guide the fastening elements of the cycling computer user interface unit around the shaft.

11. The apparatus of claim 1, wherein the fastening structure at the lower side of the base comprises a cross element with an elevated part in each crossarm so as to allow a fastening strap to pass between a crossarm and the lower side of the base.

12. The apparatus of claim 1, further comprising a stabilizing element that is placed between at least one fastening strap and a bicycle so as to prevent vibration of the cycling computer user interface unit.

13. A method, comprising:
forming a base so as to attach a cycling computer user interface unit to a bicycle via the base;
providing a shaft for attaching the cycling computer user interface unit to the base such that the shaft, which penetrates at least part of a body of the base, penetrates fastening elements of the cycling computer user interface unit; and
generating a swing switch from the cycling computer user interface unit when attached to the base, wherein the cycling computer user interface unit has a limited rotational degree of freedom about the shaft and when the cycling computer user interface unit is rotated about the shaft, a function of the cycling computer user interface unit is performed.

14. A method, comprising:
mounting a base to a bicycle so as to mount a cycling computer user interface unit to the bicycle via the base;
penetrating fastening elements of the cycling computer user interface unit with a shaft, wherein the shaft is attached to the base in order to attach the base and the cycling computer user interface unit to each other; and
rotating the cycling computer user interface unit about the shaft in order to execute a function of the cycling computer user interface unit, wherein the cycling computer user interface unit serves as a swing switch when attached to the base by having a limited rotational degree of freedom about the shaft.

* * * * *

UNITED STATES PATENT AND TRADEMARK OFFICE
CERTIFICATE OF CORRECTION

| | | |
|---|---|---|
| PATENT NO. | : 8,305,742 B2 | Page 1 of 1 |
| APPLICATION NO. | : 12/836836 | |
| DATED | : November 6, 2012 | |
| INVENTOR(S) | : Onnela et al. | |

It is certified that error appears in the above-identified patent and that said Letters Patent is hereby corrected as shown below:

In the Specification:

Column 1, line 24:

Now reads: "in stead"

Should read: -- instead --

Column 3, line 43:

Now reads: "win letters"

Should read: -- with letters --

Column 5, line 63:

Now reads: "219A and 2198"

Should read: -- 219A and 219B --

Column 7, line 40:

Now reads: "225 and 225B"

Should read: -- 2125A and 225B --

Signed and Sealed this
Twenty-third Day of July, 2013

Teresa Stanek Rea
*Acting Director of the United States Patent and Trademark Office*